(No Model.)
O. B. SHALLENBERGER.
METER FOR ALTERNATING ELECTRIC CURRENTS.
No. 448,677. Patented Mar. 24, 1891.
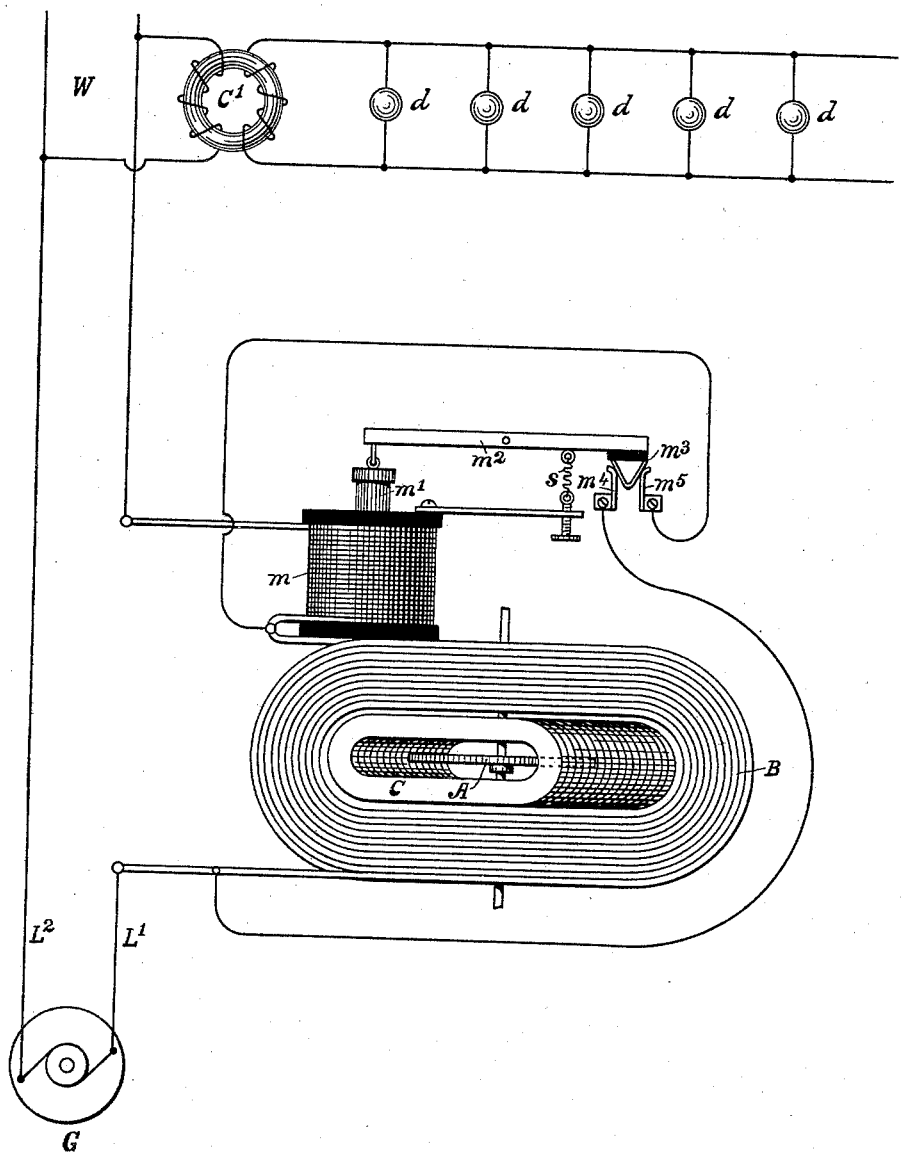
Witnesses
James W. Smith
Edward W. Kelly
Inventor
Oliver B. Shallenberger
By his Attorney
Charles A. Terry

UNITED STATES PATENT OFFICE.

OLIVER B. SHALLENBERGER, OF ROCHESTER, ASSIGNOR, BY MESNE ASSIGNMENTS, TO THE WESTINGHOUSE ELECTRIC AND MANUFACTURING COMPANY, OF PITTSBURG, PENNSYLVANIA.

METER FOR ALTERNATING ELECTRIC CURRENTS.

SPECIFICATION forming part of Letters Patent No. 448,677, dated March 24, 1891.

Application filed March 13, 1890. Serial No. 343,705. (No model.)

*To all whom it may concern:*

Be it known that I, OLIVER B. SHALLENBERGER, a citizen of the United States, and a resident of Rochester, in the county of Beaver and State of Pennsylvania, have invented a certain new and useful Improvement in Meters for Alternating Electric Currents, (Case No. 391,) of which the following is a specification.

The invention relates to certain improvements in apparatus for measuring electric currents consumed in doing useful work upon alternating-current circuits.

The object of the invention is to provide means whereby a meter may be caused to register the current consumed in doing useful work and prevent it from being operated by leakage-currents, or by such currents as may be consumed in any other operation than doing useful work. Such a measuring-instrument is especially desirable in connection with circuits employing electric converters or transformers, for the reason that there is practically some leakage through the primary coils of the converters even when no work is being done in their secondary circuits. Therefore, unless special means are employed to guard against it, a meter placed in the primary circuit would record the flow of such currents and might be continually operated even though no useful work were being done. Again, the meter, if placed in the secondary or any other circuit, may be subjected to a continual flow of current, owing to a more or less defective insulation or from some other cause.

My invention consists in so organizing a meter designed to be connected in an electric circuit that it will commence to operate only when the flow of current through the circuit to which it is applied exceeds the leakage of the circuit or of the converters connected in the circuit and at the same time will give an accurate record of the current consumed in doing useful work.

The accompanying drawing illustrates a device for carrying the invention into effect.

Referring to the figure, G represents any suitable source of alternating, intermittent, or pulsatory currents, and $L'$ $L^2$ main-line conductors leading therefrom. In the work-circuit W there is shown a converter $C'$, having its primary coil connected between the conductors $L'$ $L^2$ and its secondary coil supplying translating devices $d$—such, for instance, as incandescent electric lamps. These may be cut into and out of circuit, as desired.

The meter illustrated is of the general character described in certain Letters Patent issued to me August 14, 1888, Nos. 388,003 and 388,004. The coil B is connected in the circuit of the conductor $L'$, and the coil C is closed upon itself and placed at an angle with reference to the coil B. The currents caused to traverse the coils act upon the armature A, the revolutions of which are recorded in the manner described in the patents referred to. The meter is designed to be short-circuited so long as only the leakage-current, or the current which it is desired not to record, is flowing through the circuit. This is accomplished by connecting an electro-magnet or solenoid $m$ in series with the coil B. This solenoid is provided with a core $m'$, preferably of insulated wires, carried upon one end of a movable lever $m^2$, the other end of which carries a circuit-closing point or plate $m^3$. This point passes between the contact-springs $m^4$ and $m^5$, which are respectively connected with the terminals of the meter. When the current exceeds a predetermined value, the core is drawn into the solenoid against the opposition of a spring $s$ a sufficient distance to separate the circuit-closing point from the contact-points, and thus interrupt the shunt-circuit around the meter and allow it to operate. The solenoid remains in circuit, and thus holds the shunt-circuit open. So long as the shunt-circuit is closed, however, the currents flowing through the coil B will not be sufficient to operate the meter.

In another application filed by me December 26, 1888, Serial No. 294,568, a description is given of this form of device in connection with certain others illustrating the broad method of operation.

I claim as my invention and desire to secure by these Letters Patent—

1. The combination, with a meter for alternating electric currents, having a primary inducing-coil, a secondary coil in inductive relation thereto, and an armature acted upon by currents traversing the two coils, of a short-circuiting device applied to the primary inducing-coil and automatically operated by the currents traversing the circuit to which the meter is applied.

2. The combination of a meter for electric currents and a short-circuiting device for the meter, connected in the circuit with the meter, substantially as described.

3. The combination, with a meter for electric currents, of a primary coil B, the solenoid $m$, connected in series therewith, the shunt-circuit around the coil B, and the short-circuiting device operated by the shunt-circuit.

In testimony whereof I have hereunto subscribed my name this 28th day of February, A. D. 1890.

OLIVER B. SHALLENBERGER.

Witnesses:
S. R. ROSEMAND,
J. W. SMITH.